United States Patent [19]

Watanabe et al.

[11] Patent Number: 4,780,434
[45] Date of Patent: Oct. 25, 1988

[54] REFRACTORY COMPOSITION

[75] Inventors: Takashi Watanabe, Chiryu; Takumi Nishio, Toyota; Yoshihisa Kato, Nishio; Kazuhide Kawai, Toyota; Satoshi Doro; Takafumi Nishibe, both of Kariya; Takahiro Fukaya, Sahara, all of Japan

[73] Assignee: Toshiba Ceramics, Co., Ltd., Tokyo, Japan

[21] Appl. No.: 946,648

[22] Filed: Dec. 22, 1986

Related U.S. Application Data

[63] Continuation of Ser. No. 783,023, Oct. 2, 1985, abandoned.

[30] Foreign Application Priority Data

Oct. 2, 1984 [JP] Japan .................. 59-205496
Mar. 30, 1985 [JP] Japan .................. 60-67057

[51] Int. Cl.⁴ .............. C04B 35/04; C04B 35/10; C04B 35/44; C04B 35/52
[52] U.S. Cl. .................. 501/120; 501/100; 501/101; 501/104; 501/105; 501/109; 501/112; 501/117; 501/119
[58] Field of Search ............. 501/120, 100, 101, 104, 501/105, 109, 112, 117, 119

[56] References Cited

U.S. PATENT DOCUMENTS

| | | | |
|---|---|---|---|
| 2,152,656 | 4/1939 | McDougal et al. | 501/120 |
| 2,618,566 | 11/1952 | Robinson | 501/120 |
| 3,106,475 | 10/1963 | Davies et al. | 501/109 |
| 3,184,322 | 5/1965 | Parikh et al. | 501/120 |
| 3,577,247 | 5/1971 | McKenna | 501/120 |
| 4,126,479 | 10/1978 | Yidetto | 501/120 |
| 4,389,492 | 6/1983 | Tanemura | 501/120 |
| 4,506,022 | 3/1985 | Whittemore et al. | 222/599 |
| 4,533,646 | 8/1985 | Wang et al. | 501/120 |

FOREIGN PATENT DOCUMENTS

| | | | |
|---|---|---|---|
| 212021 | 6/1957 | Australia | 501/119 |
| 0113886 | 7/1984 | European Pat. Off. | 501/120 |
| 2745461 | 3/1979 | Fed. Rep. of Germany | 501/120 |
| 49-99306 | 9/1974 | Japan | 501/120 |
| 50-36249 | 10/1975 | Japan | 501/120 |
| 55-149170 | 11/1980 | Japan | 501/120 |
| 56-6391 | 2/1981 | Japan | 501/120 |
| 56-92160 | 7/1981 | Japan | 501/119 |
| 58-120568 | 7/1983 | Japan | 501/120 |
| 59-35068 | 2/1984 | Japan | 501/119 |
| 59-203769 | 11/1984 | Japan | 501/120 |
| 554251 | 4/1977 | U.S.S.R. | 501/120 |
| 825908 | 12/1959 | United Kingdom | 501/120 |

Primary Examiner—Mark L. Bell
Attorney, Agent, or Firm—Foley & Lardner, Schwartz, Jeffery, Schwaab, Mack, Blumenthal & Evans

[57] ABSTRACT

A refractory composition which is suitable for forming a sliding gate to be used at the bottom of a ladle or tundish is provided. The refractory composition comprises 10 to 30 parts by weight of an alumina-magnesia spinel material containing 40 to 70% by weight of $Al_2O_3$, 25 to 60% by weight of MgO and 10% or less of impurities, and 70 to 90 parts by weight of a magnesia material containing at least 90% by weight of MgO, wherein the composition contains 10 to 25% by weight of $Al_2O_3$ and 75 to 90% by weight of MgO. 1 to 10 parts by weight of $Al_2O_3$ material may be further added together with the alumina-magnesia spinel material and the magnesia material, to form the refractory composition.

9 Claims, 1 Drawing Sheet

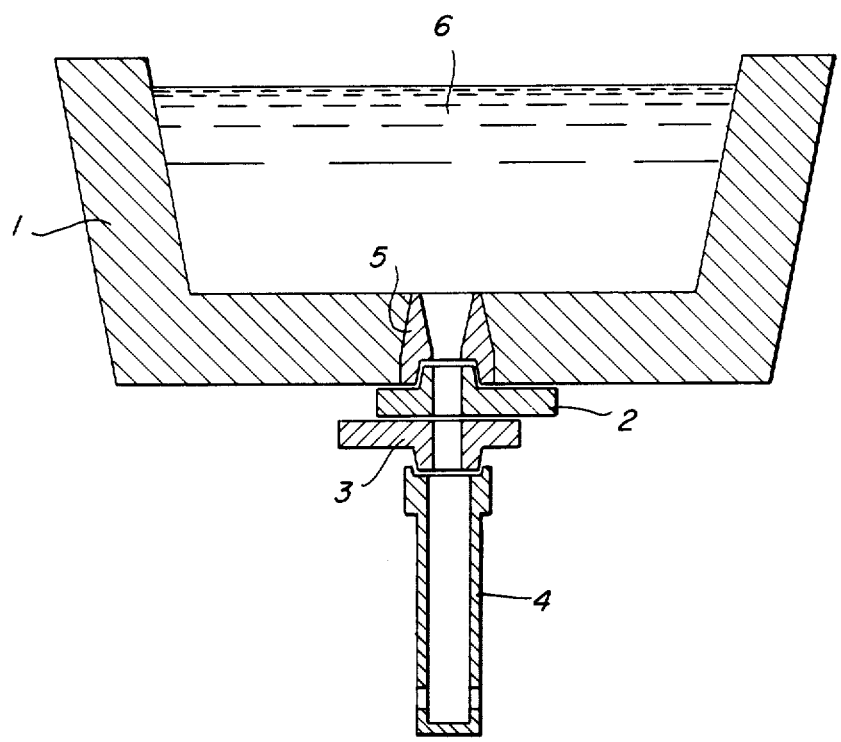

REFRACTORY COMPOSITION

This application is a continuation of application Ser. No. 783,023 filed Oct. 2, 1985 abandoned.

BACKGROUND OF THE INVENTION

1. Field of the Invention

This invention relates to a refractory composition, particularly, to a composition suitable for forming, for example, a sliding gate serving to adjust the discharge amount of a molten metal in the casting of a molten metal.

2. Description of the Prior Art

In the continuous casting of a molten metal, a sliding gate for adjusting the discharge amount of the molten metal is mounted in the ladle or in the nozzle at the bottom of a tundish.

The structure of the sliding gate is described in, for example, Japanese Published Patent Application No. 60-99460.

Various refractory materials such as high alumina materials and alumina-carbon materials are used as the materials of the sliding gate. However, since the peeling resistance, which is a special example of the spalling resistance, is an important factor of the sliding gate, the high alumina materials or alumina-carbon materials fail to provide a satisfactory material of the sliding gate. On the other hand, magnesia-based refractory materials, which exhibit a high corrosion resistance with respect to molten metal or basic slag, are widely used as materials of various steel-making furnace members such as a converter. However, a magnesia-based refractory material is low in its spalling resistance and, thus, is almost never used as the refractory material for forming the sliding gate.

Attempts to improve the spalling resistance of the magnesia-based refractory materials are reported in, for example, Japanese Patent Publication No. 53-13643, Japanese Published Patent Application No. 55-11669, Japanese Published Patent Application No. 55-107749 and Japanese Published Patent Application No. 58-26073.

In Japanese Patent Publication No. 53-13643 mentioned above, it is proposed to use a magnesia-based refractory material in combination with a periclase spinel material. In this case, the spalling resistance may be improved to some extent. But, the mixed material mentioned fails to produce a satisfactory result when it is used as the material of the sliding gate which is used under conditions much more severe than those under which the general steel-making furnace members are used. In Japanese Published Patent Application No. 55-11669, a carbon material is added to a magnesia-based refractory material so as to improve the spalling resistance of the material. The spalling resistance may certainly be improved by the addition of a carbon material. In this case, however, the resultant refractory material fails to exhibit a satisfactory mechanical strength. In Japanese Published Patent Application Nos. 55-107749 and 58-26073, it is proposed to add Si, Si—C—Al, Fe—Si, etc., together with a carbon material to a magnesia-based refractory material. In these cases, the spalling resistance of the refractory material is improved by the addition of a carbon material. Also, reduction in the mechanical strength of the refractory material caused by the carbon material addition is overcome by firing the mixture containing Si, etc., under a non-oxidizing atmosphere. However, the firing mentioned is costly. Also, the carbon material is oxidized during use of the sliding gate, leading to deterioration of the texture of the refractory material. Further, if the refractory material is used for the casting of steels which are highly corrosive to the refractory material, such as a Ca-added steel and various free cutting steels, it is impossible to obtain satisfactory results, just as in the case of using conventional high alumina material and alumina-carbon material.

SUMMARY OF THE INVENTION

One of the objects of the present invention is to provide a refractory composition, particularly, a composition suitable for a sliding gate, which can be produced without using a special manufacturing method, which exhibits an improved spalling resistance, and which exhibits a high corrosion resistance with respect to a molten metal and a basic slag.

Another object of the present invention is to provide a refractory composition, particularly, a composition suitable for a sliding gate, which exhibits an improved cold and hot strength.

It is also an object of the invention to provide an improved apparatus including a sliding gate member comprised of the refractory composition according to the invention.

According to this invention, there is provided a refractory composition comprising from about 10 to 30 parts by weight of an alumina-magnesia spinel material containing from about 40 to 75% by weight of $Al_2O_3$, from about 25 to 60% by weight of MgO and about 10% or less of impurities, and from about 70 to 90 parts by weight of a magnesia material containing at least about 90% by weight of MgO, wherein the composition contains from about 10 to 25% by weight of $Al_2O_3$ and from about 75 to 90% by weight of MgO.

Also provided is a refractory composition comprising from about 1 to 10 parts by weight of $Al_2O_3$, from about 10 to 30 parts by weight of alumina-magnesia spinel material containing from about 40 to 75% by weight of $Al_2O_3$, from about 25 to 60% by weight of MgO and about 10% or less of impurities, and from about 70 to 90 parts by weight of a magnesia material containing at least about 90% by weight of MgO, wherein the composition contains from about 10 to 25% by weight of $Al_2O_3$ and from about 75 to 90% by weight of MgO.

Also provided according to the present invention is an improved apparatus for discharging molten metal, including a sliding gate member comprised of the refractory composition of the invention.

Further objects, features and advantages of the present invention will become apparent from the detailed description of preferred embodiments which follows.

BRIEF DESCRIPTION OF THE DRAWING

The FIGURE of drawing is a cross-sectional view of a molten metal pouring apparatus having a slide gate according to the present invention.

DETAILED DESCRIPTION OF PREFERRED EMBODIMENTS

The alumina-magnesia spinel material used in the present invention contains from about 40 to 75% by weight of $Al_2O_3$ and from about 25 to 60% by weight of MgO. The composition of the material is substantially equal to the theoretical composition, that is 71.7% by weight of $Al_2O_3$ and 28.3% by weight of MgO. A material which is substantially richer in magnesia than the theoretical composition may be used in the present invention.

If the $Al_2O_3$ content of the spinel material is less than about 40% by weight, or the MgO content is higher than about 60% by weight, the spinel crystal phase consisting of alumina-periclase is diminished, resulting in failure to improve the peeling resistance of refractory material. Also, if the $Al_2O_3$ content is higher than about 75% by weight, or the MgO content is less than about 25% by weight, excessive corundum crystal are formed around the spinel crystal grains, resulting in failure to improve the corrosion resistance of the refractory material.

The magnesia material used in the present invention contains at least about 90% by weight of MgO. If the MgO content is less than about 90% by weight, the resultant refractory material fails to exhibit a sufficiently high corrosion resistance.

The composition of the present invention is comprised of from about of 10 to 30 parts by weight alumina-magnesia spinel material and from about 70 to 90 parts by weight of a magnesia material. If the amount of alumina-magnesia spinel material is less than about 10 parts by weight, or the magnesia material content is more than about 90 parts by weight, the peeling resistance of the resultant composition cannot be improved. On the other hand, if the amount of the alumina-magnesia spinel material is more than about 30 parts by weight, or the magnesia material content is less than about 70 parts by weight, the resultant refractory material fails to exhibit a satisfactory resistance of the melting loss as well as a satisfactory peeling resistance. The alumina-magnesia spinel material differs in thermal expansion coefficient from the magnesia material. However, if these materials are mixed as specified in the present invention, the thermal strain derived from the difference in the thermal expansion coefficient can be absorbed.

In the present invention, an alumina material having, desirably, an average particle size of about 10 microns or less may be added to the refractory composition which comprises an alumina-magnesia spinel material and a magnesia material. The alumina material is reaction-sintered at the matrix portion of the refractory material so as to form a secondary spinel structure and, thus, to obtain a dense matrix portion. The resultant dense structure permits improving the cold and hot strength of the refractory material. Also, formation of the secondary spinel structure leads to a small hot thermal expansion coefficient, compared with magnesia. What should be noted is that the high cold and hot strength and the small hot thermal expansion coefficient collectively lead to further improvement in the spalling resistance and the peeling resistance of the refractory material.

The alumina material content in the present invention is from about 1 to 10 parts by weight. If the amount of the alumina material is less than about 1 part by weight, the secondary spinel formation is suppressed, resulting in a failure to improve the cold and hot strength of the refractory material. On the other hand, if the alumina material content is more than about 10 parts by weight, good effects are not given to the improvement in the spalling resistance and the peeling resistance of the refractory material.

The average particle size of the alumina material should desirably be about 10 microns or less as mentioned above. If the alumina material consists of fine particles as mentioned above, the reactivity is improved so as to facilitate the secondary spinel formation.

The particle size is not particularly restricted in the present invention with respect to the alumina-magnesia spinel material and the magnesia material. However, alumina-magnesia spinel is inferior to magnesia in terms of corrosion resistance and, thus, it is necessary to decrease the amount of fine alumina-magnesia spinel particles. It follows that the alumina-magnesia spinel material should desirably consist of coarse or intermediate particles ranging from about 100 to 3000 microns.

The refractory composition for forming the sliding gate can be prepared from the raw materials mentioned above by a method similar to the general method for preparing the magnesia-based refractory composition. Specifically, prescribed amounts of alumina-magnesia spinel material and magnesia material are kneaded together with a prescribed amount of alumina material, as desired, as well as organic and/or inorganic binders in a kneader such as a mixer or a wet pan, followed by molding the kneaded mixture by means of a friction press, oil press or rubber press. The resultant molding is dried and, then, fired at 1500° C. or more under an ordinary oxidizing atmosphere by using a single kiln or tunnel kiln.

The firing temperature should be at least 1500° C. in order to enable the resultant refractory composition to exhibit the desired strength. Desirably, the firing temperature should be 1650° to 1750° C. in terms of the quality and manufacturing cost of the refractory composition.

As described previously, the refractory composition in the present invention should contain from about 10 to 25% by weight of $Al_2O_3$ and from about 75 to 90% by weight of MgO. Otherwise, the composition fails to exhibit a satisfactory peeling resistance and corrosion resistance. More desirably, the composition should contain from about 12 to 20% by weight of $Al_2O_3$ and from about 80 to 88% by weight of MgO.

The figure of drawing illustrates a molten metal pouring apparatus comprising a ladle or tundish 1 containing molten metal 6. At the bottom of the ladle or tundish is located an upper nozzle 5 and an adjacent stationary plate 2 having an opening aligned with the opening in the upper nozzle. Between the stationary plate 2 and a submerged nozzle 4 there is arranged a sliding plate 3 which can be moved in such a way that the opening therethrough can be brought into and out of alignment with the openings in upper nozzle 5 and stationary plate 2, to open and close the slide gate.

The present invention will be more clearly understood with reference to the following examples:

Example 1

The raw materials shown in Table 1 were kneaded with a wet pan at the blending ratio shown in Table 2. The kneaded mixture was molded by an oil press under the pressure of 1000 kg/cm$^2$ to prepare a molding size of 400 mm×200 mm×50 mm. After drying at 100° C. the molding was fired at 1700° C. within a tunnel kiln under the ordinary oxidizing atmosphere so as to obtain a refractory composition for forming a sliding gate.

Table 2 also shows the properties of the resultant refractory composition. The apparent porosity, bulk density and compression strength shown in Table 2 were determined by the methods specified in JIS (Japanese Industrial Standards). The corrosion resistance was measured in terms of melting loss of the composition. Specifically, a sample sized at 20 mm×150 mm, which was cut away from the produced refractory composition, was immersed for 2 hours in a molten steel melted at 1600° C. within a high frequency induction induction furnace so as to measure the melting loss of the sample. Further, for determining the peeling resistance, the surface area of 400 mm×200 mm of the produced refractory composition was smoothed to a level of 5/100 mm or less, followed by rapidly heating the smoothed surface with an oxygen-acetylene burner. The smoothed surface was kept heated for one minute. The peeling resistance was determined on the basis of the shell-like peeling of the heated surface.

TABLE 1

|  | (Raw Materials) | $Al_2O_3$ | MgO |
|---|---|---|---|
| Alumina-Magnesia | A | 68.1 | 28.8 |
| Spinel Material | B | 49.5 | 47.5 |
| Magnesia Material |  | 0.10 | 97.8 |

As apparent from Table 2, Comparative Examples 1-4 were clearly inferior to Examples 1-7 in terms of the peeling resistance of the refractory composition. Also, Examples 5-7 exhibited a marked improvement in the compressive strength, compared with Examples 1-4 and Comparative Examples 1-4. In conclusion, Examples 1-7 were found satisfactory in the properties required in the sliding gate such as the hot strength, peeling resistance and corrosion resistance.

Casting Temperature (Temp. within ladle): 1580° to 1600° C.
Casting Time: 50 to 60 minutes
Sliding gate hole diameter: 75 to 80 mm
Test 2
Ladle capacity: 70 tons
Kind of steel: Low carbon regular steel (C: 0.05%)
Casting Temperature (Temp. within ladle): 1650° C.
Casting Time: 90 to 100 minutes
Sliding gate hole diameter: 35 mm The low carbon aluminum killed steel was used in Test 1 as a typical example of low oxygen steel having an oxygen content of 500 ppm or less. The Ca-added steel was used in Test 1 as a typical example of steel having a relatively high reactivity with a refractory material. The low carbon regular steel was used in Test 2 as a typical example of steel having a medium level of oxygen content ranging between 100 ppm and 250 ppm.

The Table 3 shows the average number of times of use of the sliding gate.

TABLE 3

|  |  | Kind of Steel | | |
|---|---|---|---|---|
|  |  | Low C aluminum killed steel | Ca-added steel | Low C regular steel |
| Example | 4 | 4.1 | 2.5 | 4.5 |
|  | 5 | 4.5 | 2.8 | 5.0 |
|  | 6 | 4.8 | 3.0 | 5.5 |
| Comparative Example | 5 | 4.0 | 1.5 | 2.5 |
|  | 6 | 4.2 | 1.5 | 2.7 |

TABLE 2

| | | | | (Properties of Refractory Composition) | | | | | | | | | | |
|---|---|---|---|---|---|---|---|---|---|---|---|---|---|---|
| | | | | | EXAMPLES | | | | | | | COMPARATIVE EXAMPLES | | | |
| | | | | | 1 | 2 | 3 | 4 | 5 | 6 | 7 | 1 | 2 | 3 | 4 |
| Raw Material (Parts by weight) | Alumina-magnesia Spinel Material | A | Particle Size | 3 to 1 mm | 10 | 20 | 0 | 10 | 10 | 10 | 0 | 10 | 30 | 30 | 0 |
| | | | | Less than 1 mm | 10 | 10 | 0 | 10 | 10 | 10 | 0 | 0 | 15 | 30 | 0 |
| | | | | Powder | 0 | 0 | 0 | 10 | 0 | 0 | 0 | 0 | 0 | 0 | 0 |
| | | B | Particle Size | 3 to 1 mm | 0 | 0 | 20 | 0 | 0 | 0 | 20 | 0 | 0 | 0 | 0 |
| | | | | Less than 1 mm | 0 | 0 | 10 | 0 | 0 | 0 | 10 | 0 | 0 | 0 | 0 |
| | Magnesia Material | | Particle Size | 3 to 1 mm | 20 | 10 | 10 | 20 | 20 | 20 | 10 | 30 | 10 | 0 | 40 |
| | | | | Less than 1 mm | 20 | 20 | 20 | 20 | 20 | 20 | 20 | 20 | 15 | 0 | 20 |
| | | | | Powder | 40 | 40 | 40 | 30 | 35 | 30 | 35 | 40 | 30 | 40 | 40 |
| | Alumina Material (average particle size 10 μm) | | | | 0 | 0 | 0 | 0 | 5 | 10 | 5 | 0 | 0 | 0 | 0 |
| | Pulp Waste Liquid | | | | 5 | 5 | 5 | 5 | 5 | 5 | 5 | 5 | 5 | 5 | 5 |
| Chemical Analysis of Refractory Composition (wt %) | | | $Al_2O_3$ | | 13.7 | 20.5 | 14.9 | 20.5 | 18.7 | 23.7 | 19.9 | 6.8 | 30.7 | 40.9 | 0.1 |
| | | | MgO | | 84.0 | 77.1 | 82.7 | 77.1 | 79.1 | 74.2 | 77.8 | 90.9 | 66.8 | 56.4 | 97.8 |
| Apparent Porosity (%) | | | | | 16.5 | 16.6 | 16.4 | 17.0 | 15.4 | 13.0 | 14.5 | 16.4 | 17.3 | 17.5 | 16.5 |
| Bulk Density | | | | | 2.91 | 2.92 | 2.89 | 2.89 | 3.07 | 3.09 | 3.07 | 2.89 | 2.90 | 2.93 | 2.88 |
| Compressive Strength (kgf/cm$^2$) | | | | | 620 | 660 | 650 | 600 | 870 | 1012 | 950 | 650 | 560 | 500 | 680 |
| Bending Strength (kgf/cm$^2$) | | | Room Temp. | | 117 | 125 | 123 | 113 | 135 | 193 | 142 | 120 | 103 | 92 | 280 |
| | | | 1400° C. | | 56 | 60 | 59 | 54 | 85 | 120 | 96 | 60 | 51 | 46 | 100 |
| Corrosion Resistance (melting loss; mm) | | | | | 1.4 | 1.5 | 1.6 | 1.8 | 1.2 | 0.9 | 1.1 | 1.3 | 1.8 | 2.0 | 1.2 |
| Peeling Resistance (peeling occurrence) | | | | | small | none | none | small | none | none | none | large | medium | medium | large |

Further, utility tests were conducted under the following conditions, using a sliding gate formed of the refractory composition of the present invention (Examples 4, 5, 6), a sliding gate formed of the conventional high alumina material impregnated with tar or pitch (Comparative Example 5), and a sliding gate formed of the conventional alumina-carbon material (Comparative Example 6):

Test 1
Ladle capacity: 250 tons
Kind of steel: Low carbon aluminum killed steel and Ca-added steel The Table 3 shows that the sliding gates of Examples 4-6 were somewhat superior to the sliding gates of Comparatives 5 and 6 with respect to the low carbon aluminum killed steel having a low oxygen content. However, the life of the sliding gates for Examples of the present invention was found about two times as high as that of sliding gates formed of the conventional material with respect to the low carbon regular steel having a relatively high oxygen content or the Ca-added steel having a relatively high reactivity with a refractory material. The main reason for the long life mentioned above is thought to be that the refractory composition of the present invention has a strong texture and is less reactive to the high reductive Ca, MnO, FeO, etc., contained in the molten steel.

The raw material used in the present invention may be prepared by either sintering or thermal fusion. In other words, the present invention is not restricted at all by the method of preparing the raw materials.

It is possible to add other refractory materials such as chrome ore, chromium oxide and zirconia as well as metals such as Si, Al, Fe—Si and Mg to the alumina-magnesia spinel material and magnesia material specified in the present invention. If metals such as Si, Al are added to the composition, the composition may be fired under a nitrogen atmosphere so as to form $Si_3N_4$ bond or AlN bond.

Further, the refractory composition of the present invention may be impregnated with tar, pitch, resin or a liquid material containing substances which can be converted into silica, alumina, magnesia, zirconia or chromium oxide in the subsequent heat treatment. The impregnated refractory composition may be used as it is, or the volatile components may be evaporated so as to provide a refractory composition suitable for forming a sliding gate having a more improved life.

As described above in detail, the present invention provides a refractory composition suitable for forming a sliding gate. The refractory composition of the present invention can be provided without using a special manufacturing method. Also, the composition exhibits an improved peeling resistance and high resistance of corrosion with respect to a molten metal and basic slag, with the result that the sliding gate formed of the refractory composition of the present invention exhibits a long life.

What is claimed is:

1. A starting batch for a refractory material consisting essentially of:
    (a) from about 10 to 30 parts by weight of a primary alumina-magnesia spinel material consisting essentially of from about 40 to 75% by weight of $Al_2O_3$ and from about 25 to 60% by weight of MgO;
    (b) from about 70 to 90 parts by weight of a magnesia material containing at least about 90% by weight of MgO; and
    (c) from about 1 to 10 parts by weight of an alumina material having an average particle size of less than about 10 microns, upon firing said alumina material forming, in a matrix portion between said primary spinel and said magnesia material, a secondary spinel structure with said magnesia material;
    wherein said starting batch results in a refractory material consisting essentially of from about 10 to 25% by weight of $Al_2O_3$ and from about 75 to 90% by weight of MgO.

2. A starting batch according to claim 1, wherein said refractory material consists essentially of from about 12 to 20% by weight of $Al_2O_3$ and from about 80 to 88% by weight of MgO.

3. A starting batch according to claim 1, further consisting essentially of an additional refractory material.

4. A starting batch according to claim 3, wherein said additional refractory material consists essentially of chrome ore, chromium oxide or zirconia.

5. A starting batch according to claim 1, further consisting essentially of a metal.

6. A starting batch according to claim 5, wherein said metal consists essentially of Si, Al, Fe—Si or Mg.

7. A starting batch according to claim 1, wherein said refractory material is impregnated with tar, pitch, resin or a liquid material containing substances which can be converted into silica, alumina, magnesia, zirconia or chromium oxide upon heat treatment.

8. A process for producing a refractory material comprising the steps of:
    (a) mixing raw materials consisting essentially of from about 10 to 30 parts by weight of a primary alumina-magnesia spinel material comprising from about 40 to 75% by weight of $Al_2O_3$ and from about 25 to 60% by weight of MgO, from about 70 to 90 parts by weight of a magnesia material containing at least about 90% by weight of MgO, and from about 1 to 10 parts by weight of a alumina material having an average particle size of less than about 10 microns to form a kneaded mixture;
    (b) molding said kneaded mixture to a desired form;
    (c) drying said molded form; and
    (d) firing said dried molded form under an oxidizing atmosphere, so as to form in a matrix portion of said refractory material between said primary spinel and said magnesia material, a secondary spinel structure with said magnesia material;
    wherein said refractory material comprises from about 10 to 25% by weight of $Al_2O_3$ and from about 75 to 90% by weight of MgO.

9. A process according to claim 8, wherein said refractory material consists essentially of from about 12-20% by weight of $Al_2O_3$ and from 80 to 88% by weight of MgO.

* * * * *